United States Patent
Yan et al.

(10) Patent No.: US 9,420,645 B2
(45) Date of Patent: Aug. 16, 2016

(54) CONSTANT CURRENT CONTROL BUCK CONVERTER WITHOUT CURRENT SENSE

(71) Applicant: iWatt Inc., Campbell, CA (US)

(72) Inventors: Liang Yan, Milpitas, CA (US); Junjie Zheng, Santa Clara, CA (US); Gordon Chen, Fremont, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 259 days.

(21) Appl. No.: 13/891,163

(22) Filed: May 9, 2013

(65) Prior Publication Data

US 2013/0307425 A1 Nov. 21, 2013

Related U.S. Application Data

(60) Provisional application No. 61/648,444, filed on May 17, 2012.

(51) Int. Cl.
| | | |
|---|---|---|
| *H05B 37/00* | (2006.01) | |
| *H05B 39/00* | (2006.01) | |
| *H05B 41/14* | (2006.01) | |
| *H05B 33/08* | (2006.01) | |

(52) U.S. Cl.
CPC ........ *H05B 33/0815* (2013.01); *H05B 33/0854* (2013.01); *Y02B 20/347* (2013.01)

(58) Field of Classification Search
CPC ......... H05B 37/00; H05B 39/04; H05B 41/28
USPC .................... 315/195, 200 R, 201, 205, 206, 315/210–212, 219
See application file for complete search history.

(56) References Cited

U.S. PATENT DOCUMENTS

| | | | |
|---|---|---|---|
| 6,862,198 B2 | 3/2005 | Muegge et al. | |
| 7,285,919 B2 * | 10/2007 | Newman et al. | ............... 315/224 |
| 7,362,593 B2 | 4/2008 | Yang et al. | |
| 7,443,700 B2 | 10/2008 | Yan et al. | |
| 2005/0276294 A1 | 12/2005 | Crawford et al. | |
| 2008/0112193 A1 | 5/2008 | Yan et al. | |

(Continued)

FOREIGN PATENT DOCUMENTS

| | | |
|---|---|---|
| CN | 1806381 A | 7/2006 |
| CN | 1910808 A | 2/2007 |

(Continued)

OTHER PUBLICATIONS

Chern, T. L., et al., "Single-Stage Flyback Converter for LED Driver with Inductor Voltage Detection Power Factor Correction," *IEEE Fifth Conference on Industrial Electronics and Applications*, Jun. 15-17, 2010, pp. 2082-2087, XP031712128, , Piscataway, New Jersey, USA.

(Continued)

*Primary Examiner* — Hai L Nguyen
(74) *Attorney, Agent, or Firm* — Fenwick & West LLP

(57) ABSTRACT

A light emitting diode (LED) controller provides constant current regulation for a converter circuit providing current to an LED. The LED controller senses an inductor voltage and determines an inductor reset time from the sensed inductor voltage. Based on the determined inductor reset time, a switch on time and a switch period, the LED controller generates a control signal modifying the state of a switch coupling the converter circuit to an input voltage.

17 Claims, 4 Drawing Sheets

(56) References Cited

U.S. PATENT DOCUMENTS

2009/0058323 A1   3/2009   Yang
2009/0059632 A1   3/2009   Li et al.
2012/0025736 A1   2/2012   Singh et al.
2012/0081039 A1   4/2012   Yang et al.

FOREIGN PATENT DOCUMENTS

| CN | 101471600 A | 7/2009 |
| CN | 101790708 A | 7/2010 |
| CN | 101841242 A | 9/2010 |
| CN | 101997412 A | 3/2011 |
| CN | 102035415 A | 4/2011 |
| JP | 2011-223800 A | 11/2011 |
| TW | 201216765 A | 4/2012 |

OTHER PUBLICATIONS

European Patent Office, European Search Report and Opinion, European Patent Application No. 13167870.8, Nov. 11, 2013, twelve pages.
Chinese First Office Action, Chinese Application No. 201310191501.8, Feb. 13, 2015, 19 pages.
European First Examination Report, European Application No. 13167870.8, Sep. 29, 2014, 9 pages.
European Second Examination Report, European Application No. 13167870.8, Jun. 17, 2015, 6 pages.
Taiwan Office Action, Taiwan Application No. 102117622, Oct. 21, 2014, 15 pages.
Chinese Third Office Action, Chinese Application No. 201310191501.8, Jun. 1, 2016, 8 pages.

* cited by examiner

CONSTANT CURRENT CONTROL BUCK CONVERTER WITHOUT CURRENT SENSE

CROSS REFERENCE TO RELATED APPLICATIONS

This application claims the benefit of U.S. Provisional Application No. 61/648,444 filed May 17, 2012, which is incorporated by reference in its entirety.

BACKGROUND OF THE INVENTION

1. Field of the Invention

The present invention relates to driving LED (Light-Emitting Diode) lamps and, more specifically, to controlling the current supplied to the LED lamps.

2. Description of the Related Arts

LEDs are being adopted in a wide variety of electronics applications, for example, architectural lighting, automotive head and tail lights, backlights for liquid crystal display devices, flashlights, etc. Compared to conventional lighting sources such as incandescent lamps and fluorescent lamps, LEDs have significant advantages, including high power efficiency, good directionality, color stability, high reliability, long life time, small size, and environmental safety. Because of advantages over incandescent lamps, particularly the power efficiency (lumens per watt) and spectral quality, use of LED lamps rather than incandescent lamps is expected to increase. Additionally, LED lamps have lower environmental impact than fluorescent lighting systems (fluorescent ballast combined with fluorescent lamp), which that may cause mercury contamination during fluorescent lamp disposal.

However, while conventional incandescent lighting systems are voltage driven devices, LED lamps are current-driven devices. Hence, conventional LED lamps cannot be direct replacements of incandescent lamps and fluorescent systems without modifications to current wiring and component infrastructure. Because LED lamps are current driven, different techniques for controlling them are required.

Conventional techniques for regulating current used to drive LED lamps use an output current sensing resistor or a transformer. However, use of an output current sensing resistor causes power loss, while use of a current transformer increases overall system cost. Additionally, conventional techniques monitor the current driving a LED lamp and the output voltage to prevent voltage overshoot and protect the LED lamp by using a separate sets of components, further increasing system complexity.

SUMMARY OF THE INVENTION

A light emitting diode (LED) controller provides constant current regulation for a converter circuit providing current to an LED. The LED controller senses an inductor voltage and determines an inductor reset time from the sensed inductor voltage. Based on the determined inductor reset time, a switching on time and a switching period, the LED controller generates a control signal modifying the state of a switch coupling the converter circuit to an input voltage.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

The Figures (FIGS.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying Figures. It is noted that wherever practicable similar or like reference numbers may be used in the Figures and may indicate similar or like functionality. The Figures depict embodiments of the present invention for purposes of illustration only. One skilled in the art will readily recognize from the following description that alternative embodiments of the structures and methods illustrated herein may be employed without departing from the principles of the invention described herein.

Figure 1:
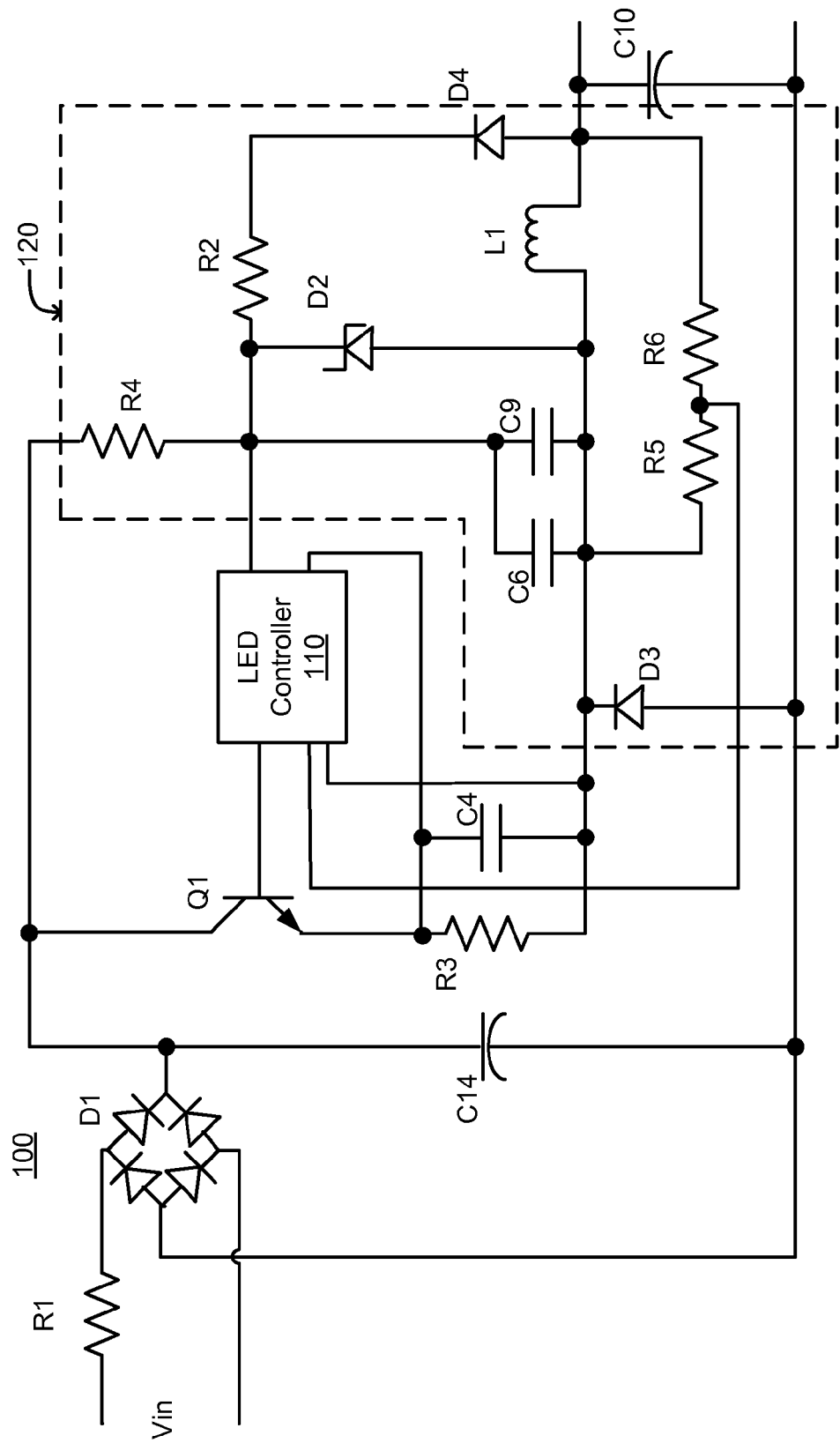
FIG. 1 illustrates a light emitting diode (LED) lamp driver circuit according to one embodiment of the present invention.

FIG. 1 illustrates an LED lamp driver circuit 100 including a bridge rectifier D1, a LED controller 110 and a converter circuit 120. In other embodiments, the LED lamp driver circuit may include different and/or additional components than those shown in FIG. 1.

Bridge rectifier D1 generates a rectified input voltage from an input voltage $V_{in}$. Converter circuit 120 generates a direct current (DC) voltage from the rectified input voltage and is controlled by a control signal from the LED controller 110. In one embodiment, converter circuit 120 is a boost converter generating a DC boosted voltage output that is greater than its input voltage. In another embodiment, converter circuit 120 is a buck converter generating a DC voltage less than the input voltage. Alternatively, the converter circuit 120 is a buck-boost converter capable of producing an output voltage that may be greater than or less than its input voltage. The converter circuit 120 also provides a sensed inductor voltage to the LED controller 110, which the LED controller 110 uses to generate the control signal for a switch Q1 regulating the input voltage to the converter circuit 120. Unlike conventional converter circuits, which sense and provide both a current and a voltage to a LED controller 110, converter circuit 120 senses and provides a voltage to the LED controller 110. Using the sensed voltage to control operation of the converter circuit 120 reduces the cost and complexity of the converter circuit 120 while mitigating power loss caused by current sensing.

In one embodiment, converter circuit 120 comprises resistors R2, R5 and R6, inductor L1, diodes D2 and D4, and capacitors C6 and C9. Additionally, switch Q1 is coupled to the output of the diode bridge D1 and to the converter circuit 120. Switch Q1 receives a control signal from the LED controller 110 and regulates a connection of the converter circuit 120 to the output of the diode bridge D1 accordingly. For example, when the control signal has a high value, switch Q1 is in an on state where the rectified input voltage from the output of the diode bridge D1 is coupled to the converter circuit 120; conversely, when the control signal has a low value, switch Q1 is in an off state where the rectified input voltage from the output of the diode bridge D1 is not coupled to the converter circuit 120. In various embodiments, switch Q1 may be a bipolar junction transistor (BJT) or a metal oxide semiconductor field effect transistor (MOSFET).

Inductor L1 stores power from rectified input voltage when switch Q1 is in the on state and releases stored power when switch Q1 is in an off state. Resistors R5 and R6 form a voltage divider providing a sensed voltage across inductor L1, "the sensed inductor voltage," to the LED controller 110. From the sensed inductor voltage, the LED controller 110 generates a regulation voltage used to generate the control signal for operating switch Q1, as further described below. In one embodiment, the LED controller 110 controls converter circuit 120 to achieve constant current operation in which substantially constant current is maintained through LED lamps coupled to the LED driver circuit 100. In one embodiment, the LED controller 110 maintains constant current operation by estimating output current of the converter circuit 120 from an inductor reset time obtained from the sensed inductor voltage, the length of time switch Q1 is in an on-state and the length of time between switch Q1 being in on-states, as further described below.

LED Controller

The LED controller 110 receives sensed voltage input to the converter circuit 120, measured across a sensing resistor (resistor $R_{is}$ in FIG. 2A and FIG. 2B) and sensed inductor voltage $V_L$ from the converter circuit 120. Based on the sensed inductor voltage $V_L$ and the sensed input voltage $V_{Ris}$, the LED controller 110 generates a control signal modifying the state of a switch providing input voltage to the converter circuit 120. Hence, the LED controller 110 regulates the current output by the converter circuit 120. Additionally, by controlling supply of input voltage to the converter circuit 120, the LED controller 110 prevents the output of the converter circuit 120 from overshooting, protecting LED lamps coupled to the LED driver circuit 100.

Figure 2A:
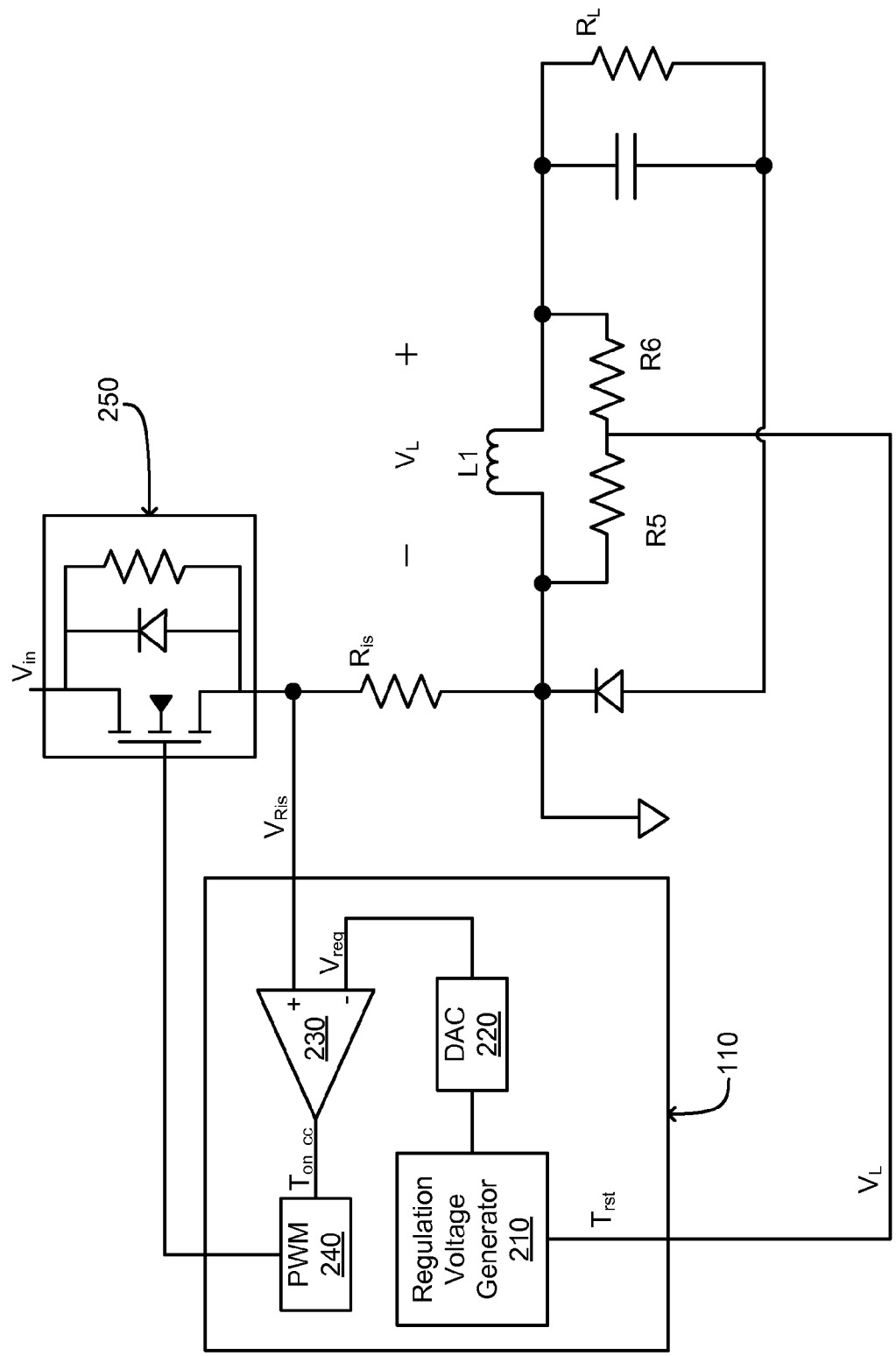
FIG. 2A illustrates a block diagram of a LED controller providing constant current without using output current sense resistor or current transformer according to one embodiment of the present invention.
Figure 2B:
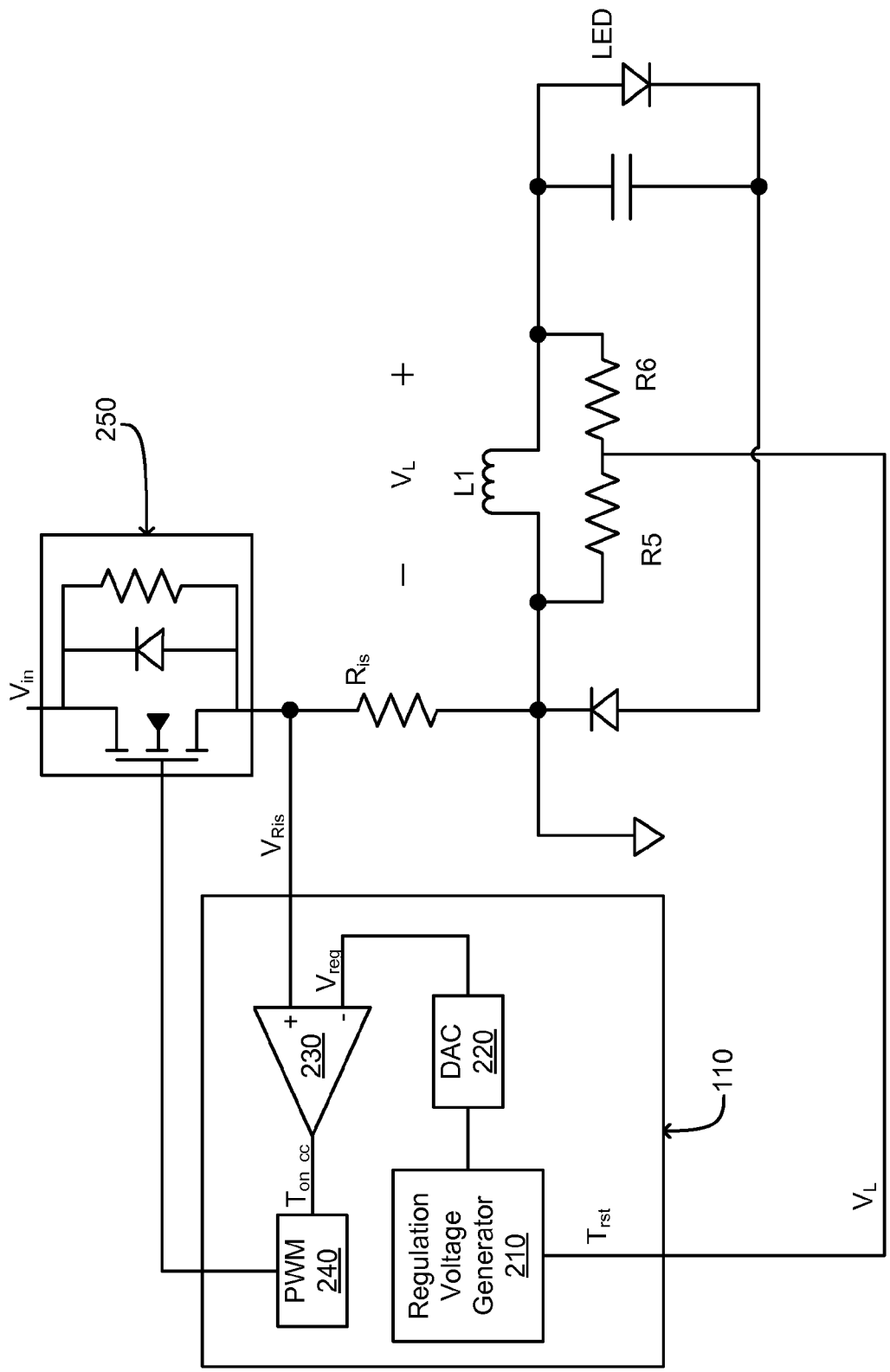
FIG. 2B illustrates a block diagram of a LED controller providing constant current without using output current sense resistor or current transformer according to another embodiment of the present invention.

FIG. 2A and FIG. 2B illustrate example embodiments of an LED controller 110 including a regulation voltage generator 210, a digital-to-analog converter (DAC) 220, a comparator 230 and a pulse width modulation (PWM) unit 240. An output of the LED controller 110 is coupled to a switch 250, which is coupled to an input voltage Vin as well as to an input sensing resistor $R_{is}$. FIG. 2A and FIG. 2B also illustrate components of the converter circuit coupled to the input sensing resistor $R_{is}$ for purposes of illustration. In the example embodiment of FIG. 2A, the load of the converter circuit is a resistor $R_L$, and in the example embodiment of FIG. 2B, the load of the converter circuit is a diode, such as a light emitting diode (LED).

The regulation voltage generator 210 generates a regulation voltage based on an inductor voltage $V_L$ from a voltage divider, formed by R5 and R6, in parallel to the inductor L1 in the converter circuit, data specifying the length of time time during which the switch 250 is on, $T_{on}$, and the switching period, $T_p$, of the switch 250. The switching period, $T_p$, is length of time between the switch entering an on state and again entering an on state. For example, $T_p$ is the length of time between the rising edges of a control signal applied to the switch 250. Using the inductor voltage $V_L$, $T_{on}$ and $T_p$, the regulation voltage generator 210 generates regulation voltage used to generate one or more control signals for the switch 250. In one embodiment, the regulation voltage generated by the regulation voltage generator 210 is a digital value that is communicated to the DAC 220, which produces an analog regulation voltage $V_{reg}$.

To generate the regulation voltage, the regulation voltage generator 210 uses the inductor voltage $V_L$ to determine a reset time, $T_{rst}$, for the inductor L1. For example, the regulation voltage generator 210 receives the inductor voltage $V_L$ during operation and determines the reset time, $T_{rst}$, as the time needed for the inductor voltage $V_L$ to transition from a first voltage level to a second voltage level. For example, the regulation voltage generator 210 determines $T_{rst}$ as the time for the inductor voltage $V_L$ to transition from a voltage of $V_o$-$V_{in}$ to a voltage of $V_o$, where $V_{in}$ is an input voltage to the converter circuit and $V_o$ is an output voltage of the converter circuit. In one embodiment, the regulation voltage generator 210 calculates the regulation voltage as:

$$V_{reg} = K_{cc} \frac{T_p}{T_{on} + T_{rst}} \quad (1)$$

Where $K_{cc}$ is a constant further described below, $T_p$ is the switching period of the switch 250, $T_{on}$ is the time the switch 260 is in an on state and $T_{rst}$ is the reset time of the inductor L1. In one embodiment, the voltage regulation generator 210 calculates $K_{cc}$ as:

$$K_{cc} = 2I_{out\_nom}R_{is\_nom} \quad (2)$$

Where $R_{is\_nom}$ is the resistance of the input sensing resistor $R_{is}$, which may be specified or predetermined, and $I_{out\_nom}$, also identified as $I_{out}$, is the specified, or desired, output current for the converter circuit. Based on $R_{is\_nom}$ and $I_{out\_nom}$ $K_{cc}$ may be determined from the constant output current regulation theory, which provides:

$$\frac{i_{pk}}{2} \frac{T_{on} + T_{rst}}{T_p} = I_{out} \quad (3)$$

The peak current, $i_{pk}$, can be expressed in terms of the voltage across the input sensing resistor $R_{is}$ as $i_{pk} = V_{reg}/R_{is}$. Substituting this in Equation (3) and solving for $V_{reg}$ results in:

$$V_{reg} = 2I_{out}R_{is} \frac{T_p}{T_{on} + T_{rst}} \quad (4)$$

Accordingly, $K_{cc}$ may be determined as double the product of the specified output current $I_{out}$ and the resistance of the current sense resistor $R_{is}$. From the stored constant, $K_{cc}$, switch on time, $T_{ON}$, of the switch 250 and switch period, $T_p$, of the switch 250 and the inductor reset time, $T_{rst}$.

The DAC 220 outputs an analog version of the regulation voltage $V_{reg}$ as an input to the comparator 230, which also receives the voltage across the input sensing resistor $V_{Ris}$ as input. The comparator 230 determines whether the voltage across the current sense resistor $V_{Ris}$ exceeds the regulation voltage $V_{reg}$ and generates a control signal $T_{on\_cc}$ based on the determination. If the voltage across the input sensing resistor $V_{Ris}$ exceeds the regulation voltage $V_{reg}$, the control signal $T_{on\_cc}$ has a first value that terminates the on state of the switch 250. The control signal $T_{on\_cc}$ is communicated to the PWM unit 240 which modifies the state of the switch 250 accordingly. For example, if the control signal $T_{on\_cc}$ has the first value, the PWM unit modifies the switch 250 to terminate the on state. Hence, the LED controller 310 determines a regulation voltage $V_{reg}$ from the inductor voltage $V_L$ and uses the regulation voltage $V_{reg}$ to produce a control signal modifying the state of the switch 250.

Figure 3:
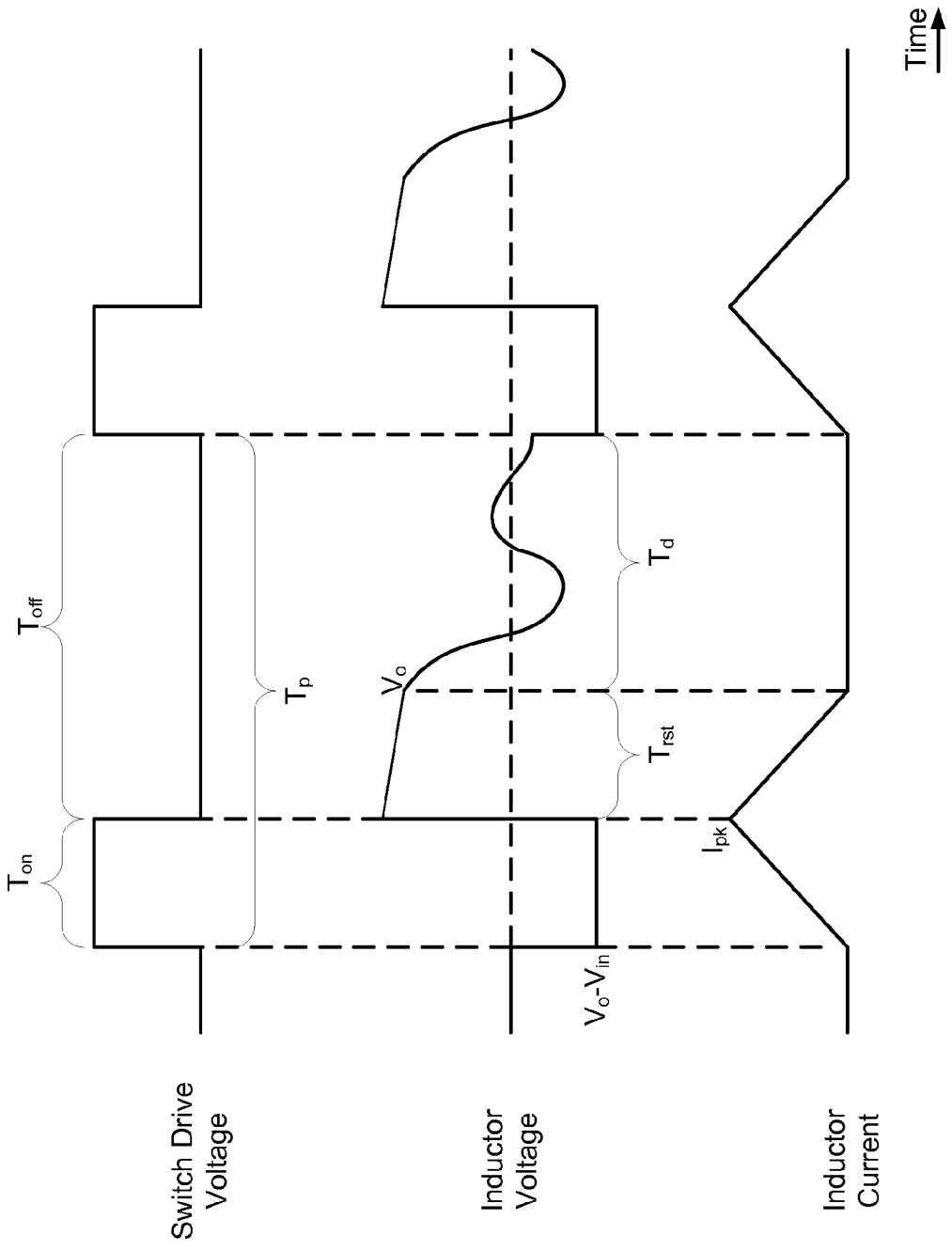
FIG. 3 illustrates example waveforms produced by the LED controller illustrated in FIG. 2A and FIG. 2B according to one embodiment

FIG. 3 illustrates example waveforms produced by the LED controller 110 illustrated in FIG. 2A and FIG. 2B. FIG. 3 shows the control signal applied to the switch 250 by the LED controller 110 to transition it between an on state and an off state. In FIG. 3, the switch is in an on state when the control signal is high and is in an off state when the control signal is low. Hence, in FIG. 3, the switch 250 is in the on state for the time the control signal is high, identified in FIG. 3 as $T_{on}$. During the time the control signal is low $T_{off}$ the switch 250 is in an off state. FIG. 3 also identifies the time between the control signal rising to a high level and the control signal again rising to the high level as the switching period, denoted as $T_p$.

In the example of FIG. 3, during $T_{on}$, when the switch 250 is in an on state, the inductor voltage $V_L$ is the difference between the input voltage $V_{in}$ and the output voltage $V_o$, denoted as $V_o$-$V_{in}$ in FIG. 3. However, when the switch 250 is in an off state, the inductor voltage $V_L$ is $V_o$, FIG. 3 also shows the inductor current, illustrating that the inductor current has a triangular waveform increasing from zero to a maximum value $I_{max}$ while the switch 250 is in the on state. Thus, the inductor current is maximized at the end of the interval when the control signal is high. When the control signal transitions from a high level to a low level, the switch 250 enters an off state, and the inductor current decreases from the maximum value $I_{max}$ back to zero over a time interval, which is the reset time $T_{rst}$. As shown in FIG. 3, the reset time $T_{rst}$ also corresponds to the time elapsed for the inductor voltage to reach the output voltage $V_o$. Hence, the LED controller 110 may determine the reset time $T_{rst}$ by monitoring the inductor voltage $V_L$ and calculating the time for the inductor voltage $V_L$ to reach the output voltage $V_o$ when the switch 250 transitions from the on state to the off state. FIG. 3 also shows the presence of dead time $T_d$ during the time the control signal is low. During the dead time $T_d$, the inductor voltage $V_L$ continues to decrease from the output voltage V0 and the inductor current is zero.

When the control signal transitions to a high state, the switch 250 again transitions to an on state, the inductor voltage $V_L$ transitions to the output voltage less the input voltage $V_o$-$V_{in}$ and the inductor current begins linearly rising from zero to its maximum value $I_{pk}$. The inductor current reaches its maximum value $I_{pk}$ when the switch 250 transitions to the off state. When the switch 250 transitions to the off state, the inductor current begins linearly decreasing from its maximum value $I_{pk}$ to zero during the reset time $T_{rst}$. Also during the reset time $T_{rst}$, the inductor voltage $V_L$ transitions to the output voltage $V_o$, reaching the output voltage $V_o$ at the end of the reset time $T_{rst}$, when the inductor currents returns to having a value of zero.

Upon reading this disclosure, those of skill in the art will appreciate still additional alternative designs for LEI) controllers providing constant current control without current sing. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention.

The invention claimed is:

1. A method for controlling an output current of a power supply, an output of the power supply coupled to an inductor:
   storing, in the inductor, power from the power supply when a switch is on and transferring power form the inductor to a load when the switch is off;
   sensing a voltage across the inductor;
   sensing a voltage across a switching current sense resistor coupled in series to the switch and to the inductor;
   determining a reset time of the inductor by determining a duration for the voltage across the inductor to decrease from a first value to a second value;
   determining a regulation voltage, wherein the regulation voltage is directly proportional to the switching period of the switch, a nominal output current value and a resistance of the switching current sense resistor, and inversely proportional to the sum of the reset time and the length of time the switch is in an on state;
   generating a control signal responsive to a comparison between the voltage across the switching current sense resistor and the regulation voltage, the control signal transitioning the switch to an off state responsive to the voltage across the switching current sense resistor exceeding the regulation voltage.

2. The method of claim 1, wherein generating the control signal comprises determining the duty cycle of the control signal based on the comparison between the voltage across the switching current sense resistor and the regulation voltage.

3. The method of claim 1, wherein the inductor discharges through a light emitting diode (LED).

4. The method of claim 1, wherein the switch is a bipolar junction transistor (BJT).

5. The method of claim 1, wherein the switch is a field effect transistor (FET).

6. A constant current controller comprising:
   a converter circuit, comprising:
      a switch configured to turn on or off responsive to a control signal being active or inactive,
      an inductor coupled to the switch configured to store power from a supply voltage when the switch is on and to transfer power to a load when the switch is off, and
      a switching current sense resistor coupled in series to the switch and the inductor; and
   a voltage sense circuit coupled to the inductor of the converter circuit, the voltage sense circuit configured to sense an inductor voltage across the inductor; and
   a controller comprising a first input coupled to the voltage sense circuit, a second input coupled to the switch current sense resistor and an output coupled to the switch of the converter circuit, the controller configured to:
      sense a voltage across the switching current sense resistor,
      determine a reset time of the inductor based on the sensed inductor voltage sensed by the voltage sense circuit, determine a regulation voltage from the determined reset time, a switching period of the switch and a length of time the switch is in an on state, and generate a control signal responsive to ta comparison between the voltage across the switching current sense resistor and the regulation voltage, the control signal transitioning the switch to an off state responsive to the voltage across the switching current sense resistor exceeding the regulation voltage.

7. The constant current controller of claim 6, wherein the switching current sense resistor is configured to sense the current through the switch during the switch on time.

8. The constant current controller of claim 7 wherein the controller further comprises:

a digital to analog converter (DAC), an input of the DAC coupled to the output of the regulation voltage generator and an output of the DAC coupled to the comparator, the DAC configured to convert a digital representation of the regulation voltage into an analog representation of the regulation voltage.

9. The constant current controller of claim 7, wherein the controller comprises:

a regulation voltage generator coupled to the first input of the controller, the regulation voltage generator configured to generate a regulation voltage based on the sensed inductor voltage, a length of time the switch of the converter circuit is on and a switching period of the switch;

a comparator receiving the regulation voltage from the regulation voltage generator and the voltage across the switching current sense resistor, the comparator configured to generate a comparator output signal responsive to a comparison between the regulation voltage and the voltage across the switching current sense resistor; and a pulse width modulator (PWM) configured to receive the comparator output signal and generate the control signal transitioning the switch to an off state responsive to the voltage across the switching current sense resistor exceeding the regulation voltage.

10. The constant current controller of claim 9, wherein the regulation voltage is directly proportional to the switching period of the switch and inversely proportional to the sum of a reset time and the length of time the switch of the converter circuit is on, the reset time representing a duration for a current across the inductor of the converter circuit to decrease from a peak value to a minimum value.

11. The method of claim 10, wherein the regulation voltage is directly proportional to a nominal output current value and a resistance of the switching current sense resistor.

12. The constant current controller of claim 6, wherein generating the control signal comprises determining the duty cycle of the control signal based on the comparison between the voltage across the switching current sense resistor and the regulation voltage.

13. The constant current controller of claim 6 further comprising:

a bridge rectifier coupled to the switch, the bridge rectifier configured to rectify an alternating current (AC) supply voltage and generate a direct current (DC) supply voltage.

14. The constant current controller of claim 6 wherein the switch is a bipolar junction transistor.

15. The constant current controller of claim 6 wherein the switch is a field effect transistor (FET).

16. The constant current controller of claim 15 wherein the FET is a metal oxide semiconductor FET (MOSFET).

17. The constant current controller of claim 4 wherein the load is a light emitting diode (LED).

* * * * *